United States Patent
Ayele et al.

(10) Patent No.: US 10,684,251 B2
(45) Date of Patent: Jun. 16, 2020

(54) ION SENSITIVE FIELD EFFECT TRANSISTOR (ISFET) HAVING HIGHER SENSITIVITY IN RESPONSE TO DYNAMIC BIASING

(71) Applicant: STMicroelectronics (Crolles 2) SAS, Crolles (FR)

(72) Inventors: Getenet Tesega Ayele, Villeurbanne (FR); Stephane Monfray, Eybens (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 341 days.

(21) Appl. No.: 15/631,078

(22) Filed: Jun. 23, 2017

(65) Prior Publication Data

US 2018/0372679 A1     Dec. 27, 2018

(51) Int. Cl.
*G01N 27/414*     (2006.01)

(52) U.S. Cl.
CPC ................ *G01N 27/4148* (2013.01)

(58) Field of Classification Search
None
See application file for complete search history.

(56) References Cited

U.S. PATENT DOCUMENTS

| | | | | |
|---|---|---|---|---|
| 2005/0230271 A1* | 10/2005 | Levon | ................ | G01N 27/4148 205/789 |
| 2015/0330941 A1* | 11/2015 | Smith | ............... | H01L 29/66969 257/253 |
| 2016/0013205 A1* | 1/2016 | Vinet | .................... | H01L 21/762 257/351 |

OTHER PUBLICATIONS

Spijknnan et al. (Adv. Funct. Mater. 20, 898-905) (Year: 2010).*
Jang et al. (Appl. Phys. Letters 99, 043703) (Year: 2011).*
Agilent 4155C Technical Data (Year: 2000).*
Jang et al. (Appl. Phys. Letters 100, 073701) (Year: 2012).*
Agilent 4155C User's Guide (Year: 2012).*
Ayele, et al., "TCAD Simulation of an Ultrahigh Sensitive ISFET with a Sensitive Gate Integrated in the BEOL of an FDSOI Industrial Platform,".
P. Bergveld, Development of an Ion-Sensitive Solid-State Device for Neurophysiological Measurements, IEEE Transactions on Bio-Medical Engineering, Jan. 1970.
Hyun-June Jang, Won-Ju Cho, Performance Enhancement of Capacitive-Coupling Dual-gate Ion-Sensitive Field-Effect Transistor in Ultra-Thin-Body, Seoul 139-701, Scientific reports, 2014.
Kaisti, et al., "An Ion-Sensitive Floating Gate FET Model: Operating Principles and Electrofluidic Gating," IEEE Trans. on Electron Devices, vol. 62, No. 8, 2015.

(Continued)

*Primary Examiner* — Luan V Van
*Assistant Examiner* — Steven E Rosenwald
(74) *Attorney, Agent, or Firm* — Crowe & Dunlevy

(57) ABSTRACT

A dual gate ion sensitive field effect transistor (ISFET) includes a first bias voltage node coupled to a back gate of the ISFET and a second bias voltage node coupled to a control gate of the ISFET. A bias voltage generator circuit is configured to generate a back gate voltage having a first magnitude and a first polarity for application to the first bias voltage node. The bias voltage generator circuit is further configured to generate a control gate voltage having a second magnitude and a second polarity for application to the second bias voltage node. The second polarity is opposite the first polarity.

7 Claims, 3 Drawing Sheets

(56) References Cited

OTHER PUBLICATIONS

K. B. Parizi, A. J. Yeh, A. S. Y. Poon and H. S. P. Wong, (2012, Dec.) "Exceeding Nernst limit (59mV/pH): CMOS-based pH sensor for autonomous applications," Presented at Electron Devices Meeting (IEDM), IEEE.

Rahhal, et al., "High Sensitivity pH Sensing on the BEOL of Industrial FDSOI Transistors,".

Ramesh, et al., "Towards in vivo biosensors for low-cost protein sensing," Electronics Letters, vol. 49, No. 7, 2013.

Rothberg, J. M., Hinz, W., Rearick, T. M., Schultz, J., Mileski, W., Davey, M., . . . & Hoon, J. (2011). An integrated semiconductor device enabling non-optical genome sequencing. Nature, 475(7356), 348-352.

M. Spijkman, et. al., Beyond the Nernst-limit with dual-gate ZnO ion-sensitive field-effect Transistors, Applied Physics Letters, 2011 (3 pages).

S. Mezzasalma and D. Baldovino. (Dec. 1995). Characterization of silicon nitride surface in water and acid environment: a general approach to the colloidal suspensions. Coll. Inter. Sci. (8 pages).

A. Al-Ahdal, et al, High gain ISFET based MOS chemical inverter, Sensors and Actuators B 171-172 (2012) (8 pages).

Grattarola, Massimo et al: "Modeling $H^+$-Sensitive FET's with SPICE," IEEE Transactions on Electron Devices, vol. 39, No. 4, Apr. 1992, pp. 813-819.

\* cited by examiner

ION SENSITIVE FIELD EFFECT TRANSISTOR (ISFET) HAVING HIGHER SENSITIVITY IN RESPONSE TO DYNAMIC BIASING

TECHNICAL FIELD

The present invention relates to an ion sensitive field effect transistor (ISFET) and, in particular, to improving the sensitivity of an ISFET through dynamic biasing of the front gate.

BACKGROUND

Reference is made to FIG. 1 showing a prior art ion sensitive field effect transistor (ISFET) 10. The ISFET 10 is provided in and on a semiconductor substrate 12 that is, in this case, doped with a p-type dopant. Source and drain regions 14 and 16, respectively, are provided within the substrate 12, wherein the regions 14 and 16 are doped with an n-type dopant. A gate oxide layer 18 extends on a top surface of the substrate 12 at least over a channel region 20 positioned between the source region 14 and drain region 16. Metal source and drain contacts 22 and 24, respectively, are provided in electrical connection to the source and drain regions 14 and 16. An insulating material 26 covers the structures described above but includes an opening 28 exposing an upper surface of the gate oxide layer 18 above the channel region 20. The opening 26 is configured to receive a test liquid 30. The ISFET 10 does not have a conventional gate electrode. Instead, the deposited test liquid 30 provides the gate electrode. The test liquid 30 is biased by a reference electrode 32 coupled to receive a reference voltage Vref. The test liquid 30 may, for example, comprise a biological or electrochemical material. In operation, the drain current of the ISFET 10 is modulated by the ion content of the test liquid. The ISFET 10 accordingly functions as an ion sensor (for example, a pH sensor).

Reference is made to FIG. 2 showing a prior art ion sensitive field effect transistor (ISFET) 50. The ISFET 50 is provided in and on a semiconductor substrate 52 that is, in this case, doped with a p-type dopant. Source and drain regions 54 and 56, respectively, are provided within the substrate 52, wherein the regions 54 and 56 are doped with an n-type dopant. A gate oxide layer 58 extends on a top surface of the substrate 52 at least over a channel region 60 positioned between the source region 54 and drain region 56. Metal source and drain contacts 62 and 64, respectively, are provided in electrical connection to the source and drain regions 54 and 56. A gate electrode 66 (perhaps made of polysilicon) extends on and over the gate oxide layer 58 along with a metal gate contact 68. An insulating material 70 covers the structures described above with an electrical connection 72 (provided by the metallization layers—metal lines and vias) to the gate contact 68 extending through the insulating material. A conductive chemical gate electrode 74 extends on a top surface of the insulating material 70 and is electrically connected to the electrical connection 72. An insulating passivation layer 78, for example made of oxinitride or silicon nitride, extends on the top surface of the conductive chemical gate electrode 74 is configured to receive a drop of test liquid 82. The test liquid 82 is biased by a reference electrode 84 coupled to receive a reference voltage Vref. The reference electrode 84 may, for example, be deposited on the surface of the insulating passivation layer 78. In this implementation, the electrically connected gate electrode 66 and conductive chemical gate electrode 74 form a floating gate electrode and the liquid deposit provides the sensing gate electrode. The test liquid 82 may, for example, comprise a biological or electrochemical material. In operation, the drain current of the ISFET 50 is modulated by the ion content of the test liquid. The ISFET 50 accordingly functions as an ion sensor (for example, a pH sensor).

See, Al-Ahdal, et al., "High Gain ISFET based vMOS Chemical Inverter," Sensors and Actuators B 171-171 (2012), incorporated by reference.

See, also, Parizi, et al., "Exceeding Nerst Limit (59 mV/pH): CMOS-based pH Sensor for Autonomous Applications," IEEE Electron Devices Meeting (2012), incorporated by reference.

See, also, Spijkma, et al., "Beyond the Nerst-limit With Dual-Gate ZnO Ion-Sensitive Field-Effect Transistors," Applied Physicas Letters 98 (2011), incorporated by reference.

SUMMARY

In an embodiment, a sensing system comprises: a dual gate ion sensitive field effect transistor (ISFET) having a first bias voltage node coupled to a back gate of the ISFET and a second bias voltage node coupled to a control gate of the ISFET; and a bias voltage generator circuit configured to generate a back gate voltage having a first magnitude and a first polarity for application to the first bias voltage node and configured to generate a control gate voltage having a second magnitude and a second polarity, wherein the second polarity is opposite the first polarity, for application to the second bias voltage node.

In an embodiment, a method is provided for controlling operation of a dual gate ion sensitive field effect transistor (ISFET) having a first bias voltage node coupled to a back gate of the ISFET and a second bias voltage node coupled to a control gate of the ISFET. The method comprises: generating a back gate voltage having a first magnitude and a first polarity for application to the first bias voltage node; and generating a control gate voltage having a second magnitude and a second polarity, wherein the second polarity is opposite the first polarity, for application to the second bias voltage node.

BRIEF DESCRIPTION OF THE DRAWINGS

The accompanying drawings are included to provide a further understanding of the invention and are incorporated in and constitute a part of this specification, illustrate embodiments of the invention and together with the description serve to explain the principles of the invention.

In the drawings.

DETAILED DESCRIPTION

Figure 3:
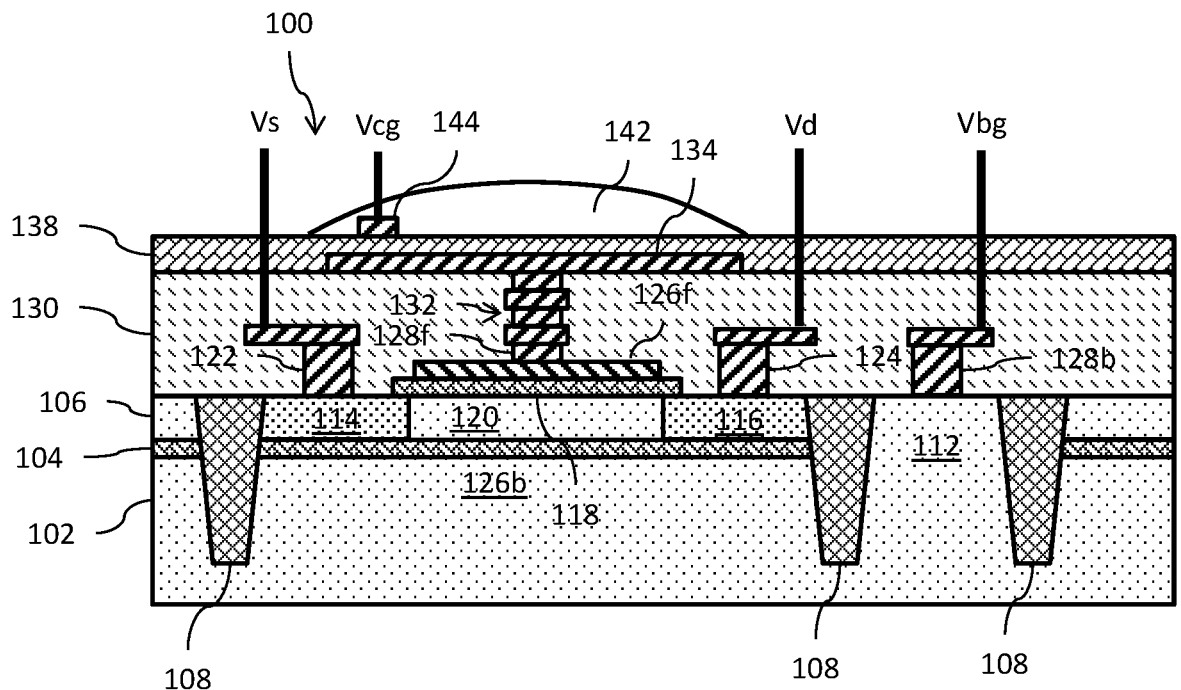
FIG. 3 shows an ISFET device implemented with a dual gate structure.

Reference is made to FIG. 3 showing a dual gate ion sensitive field effect transistor (ISFET) 100. The ISFET 100 is provided in and on a semiconductor substrate of a silicon on insulator (SOI) type including semiconductor support layer 102, a buried oxide layer 104 and a semiconductor film layer 106. The layer 102 is, in this case, doped with a p-type dopant. The layer 106 may also be doped with a p-type dopant. In an alternative implementation, the layer 106 is intrinsic semiconductor material, and the SOI substrate is of the fully-depleted (FD) type (i.e., FD-SOI). The buried oxide layer 104 may, for example, have a thickness of about 25 nm and the film layer 106 may have about the same or less thickness. In this regard, it will be noted that the structures shown in FIG. 3 are not necessarily drawn to scale.

An active region of the film layer 106 is delimited by trench isolation structures 108. Within the active region, source and drain regions 114 and 116, respectively, are provided in the film layer 106. The regions 114 and 116 are, for example, doped with an n-type dopant. Although not specifically illustrated in FIG. 3, the source and drain regions 114 and 116 may include epitaxially grown extensions that form raised source-drain (RSD) structures as commonly used for transistors fabricated in SOI technologies.

A gate oxide layer 118 extends on a top surface of the film layer 106 at least over a channel region 120 positioned between the source region 114 and drain region 116. Metal source and drain contacts 122 and 124, respectively, are provided in electrical connection to the source and drain regions 114 and 116. A front gate electrode 126f is provided on and over the gate oxide layer 118 along with a metal front gate contact 128f.

The trench isolation structures 108 further delimit a region 112 of the substrate for accessing, through electrical connection, the semiconductor support layer 102. In particular, the electrical access to a portion 126b of the semiconductor support layer 102 adjacent the buried oxide layer 104 and the channel region 120 provides a back gate electrode. Electrical connection to the region 112 is made through a metal back gate contact 128b. In an embodiment, the portion 126b of the semiconductor support layer 102 may have a different (i.e., higher) dopant concentration level than the semiconductor support layer 102 itself. The back gate electrode is biased by a back gate voltage Vbg.

An insulating material 130 covers the structures described above with an electrical connection 132 (provided by metallization layers—lines and vias) to the gate contact 128 extending through the insulating material. A conductive chemical gate electrode 134 extends on a top surface of the insulating material and is electrically connected to the electrical connection 132. An insulating passivation layer 138, for example made of oxinitride or silicon nitride, extends on the top surface of the conductive chemical gate electrode 134 and is configured to receive a drop of test liquid 142. The test liquid 142 is biased by a reference electrode 144 coupled to receive a control gate voltage Vcg. The reference electrode 144 may, for example, be deposited on the surface of the insulating passivation layer 138. In this implementation, the front gate electrode 126f and electrically connected conductive chemical gate electrode 134 form a floating gate electrode and the liquid deposit provides the sensing gate electrode. The test liquid 142 may, for example, comprise a biological or electrochemical material. In operation, the drain current of the ISFET 100 is modulated by the ion content of the test liquid. The ISFET 100 accordingly functions as an ion sensor (for example, a pH sensor).

Figure 4:
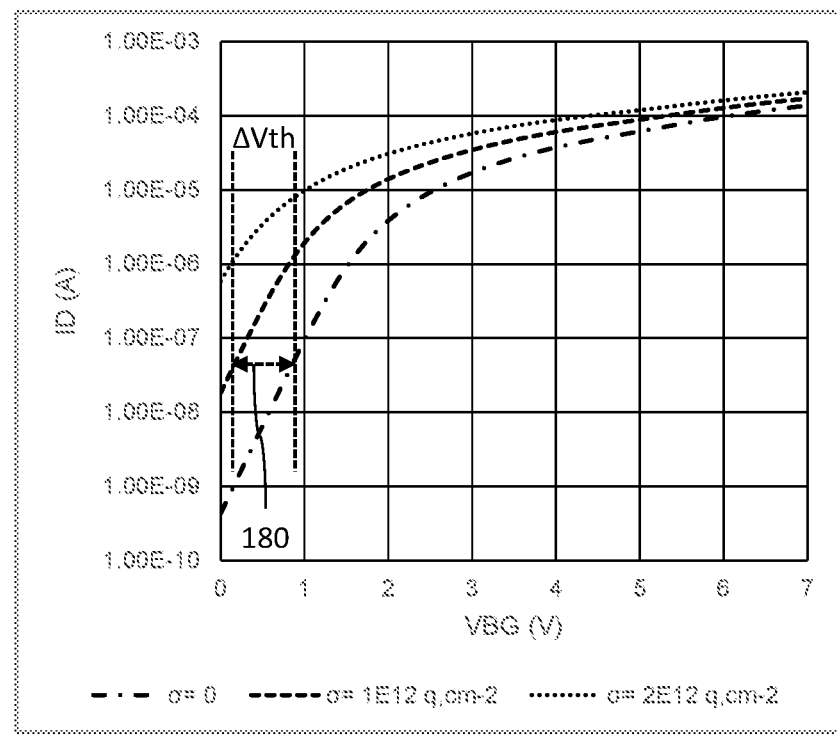
FIG. 4 illustrates a relationship between drain current and dynamic back gate voltage for the ISFET device of FIG. 3 where the control gate voltage is fixed.

FIG. 4 illustrates the drain current (ID) of the ISFET 100 as a function of back gate voltage Vbg (VBG), referred to as ID-VBG curves, for three different charge (G) levels at the sensing gate electrode where the control gate voltage Vcg is fixed and the back gate voltage Vbg is dynamically controlled (referred to as "DS" or dynamic sweep). In this example, consideration is given to a charge level of zero charges per square centimeter, a charge level of $1^E12$ charges per square centimeter and a charge level of $2^E12$ charges per square centimeter. For a given change in charge G level, such as for a change from 0 charges to $1^E12$ charges, it will be noted that there is a difference in threshold voltage ($\Delta$Vth) 180 for the ISFET of about 700 mV due to the relatively high slope of the ID-VBG curves. This $\Delta$Vth value may present an insufficient level of sensitivity for certain sensing applications.

Figure 5:
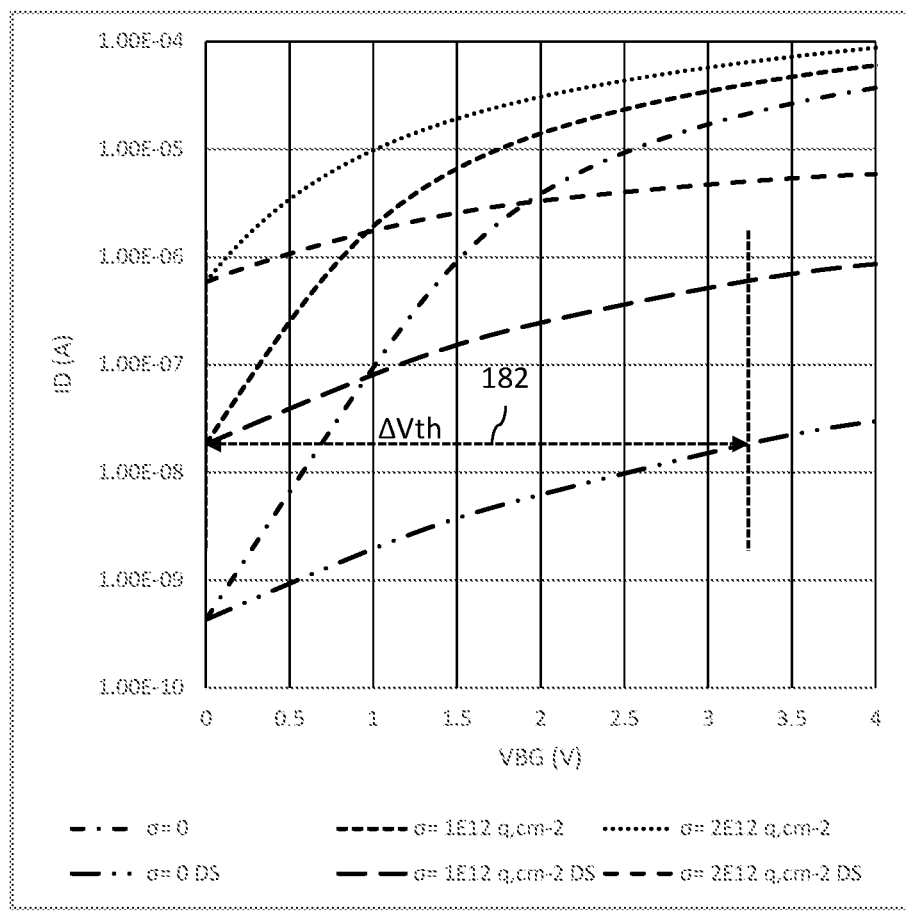
FIG. 5 illustrates a relationship between drain current and dynamic back gate voltage for the ISFET device of FIG. 3 where the control gate voltage is also dynamically varied as a function of the back gate voltage.

For comparison purposes, FIG. 5 shows the ID-VBG curves of FIG. 4 for drain current as a function of back gate voltage Vbg with a fixed control gate voltage Vcg. FIG. 5 further illustrates the drain current of the ISFET 100 as a function of back gate voltage Vbg for the same three different charge ($\sigma$) levels at the sensing gate electrode where the control gate voltage Vcg is no longer fixed but rather is dynamically varied as a function of the applied back gate voltage Vbg. Thus, in this example, both the back gate voltage Vbg and control gate voltage Vcg are dynamically controlled. In particular, the control gate voltage Vcg has a dynamically set value that is proportional in magnitude to the back gate voltage Vbg but inverse in polarity. As an example, for a back gate voltage Vbg of 0V, the control gate voltage Vcg is −0.1V, while for a back gate voltage Vbg of 4V, the control gate voltage Vcg is −0.6V. The foregoing examples are not to be considered as limiting. Bias variations are set independently by the user based on application so as to improve the sensitivity. It will be noted that the ID-VBG curves have a lower slope value in comparison to FIG. 4. Thus, for a given change in charge $\sigma$ level, there is a difference in threshold voltage ($\Delta$Vth) 182 for the ISFET of about 3.5V. This represents a greater than five times amplification of the sensitivity for the ISFET 100 when a dynamically controlled control gate voltage Vcg is used instead of a fixed control gate voltage Vcg as in FIG. 4. Put another way, for a given reading drain current, the applied back gate voltage Vbg is increased and this produces more voltage shift in function of change in charge $\sigma$. As a result, sensitivity of the device is increased.

Figure 6:
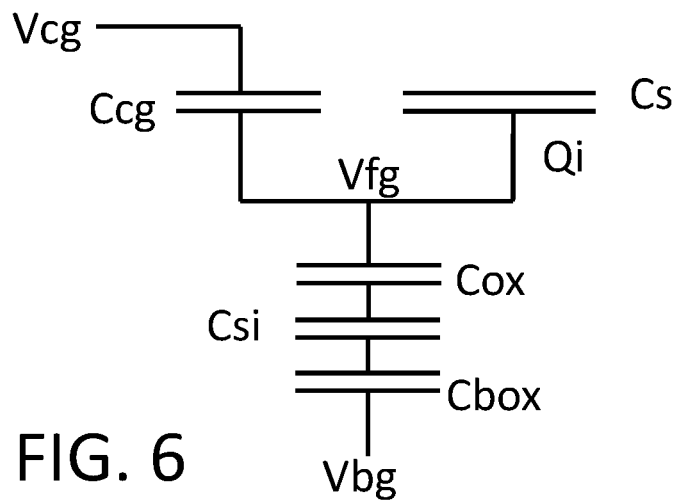
FIG. 6 is an equivalent schematic diagram of the ISFET device of FIG. 3.

FIG. 6 shows an equivalent schematic circuit for the ISFET 100 of FIG. 3. The equivalent circuit comprises a capacitance Ccg associated with the conductive chemical gate electrode 134 and the reference electrode 144 that is coupled to receive a control gate voltage Vcg. The equivalent circuit further comprises a capacitance Cs associated with the conductive chemical gate electrode 134 and the test liquid 142 which provides a charge Qi. The floating gate voltage Vfg is present at the electrically connected conductive chemical gate electrode 134 and front gate electrode 126. A set of series connected capacitances are associated with the front gate, substrate and back gate and are coupled between the floating gate voltage Vfg and the back gate voltage Vbg. These capacitances include: a capacitance Cox relating to the gate oxide layer 118, a capacitance Csi relating to the silicon channel capacitance and a capacitance Cbox relating to the buried oxide layer 104.

The floating gate voltage Vfg is given by the following equation:

$$Vfg = \frac{1}{Ct}Qi + \frac{Ccg}{Ct}Vcg$$

where Ct is the summation of the capacitances Cox and Ccg. Qi is the induced charge in the floating gate due to the charge σ at the insulating passivation layer 138 above the conductive chemical gate electrode 134. As noted above, the control gate voltage Vcg is dynamically varied as a function of the applied back gate voltage Vbg. In particular, the control gate voltage Vcg has a dynamically set value that is proportional in magnitude to the back gate voltage Vbg but inverse in polarity.

Figure 7:
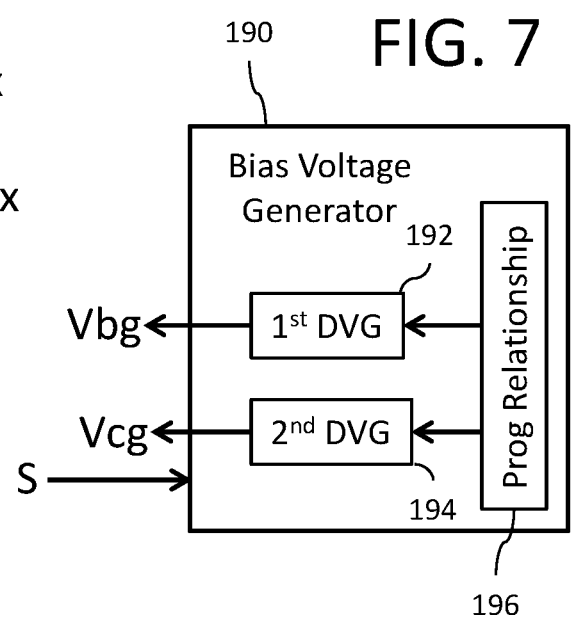
FIG. 7 is a block diagram of a voltage generator for used with the ISFET device of FIG. 3 for implementing dynamically varying back gate and control gate voltages.

Reference is now made to FIG. 7 showing a block diagram for a bias voltage generator circuit 190 that is configured to generate the control gate voltage Vcg and the back gate voltage Vbg. The circuit 190 receives a control signal S for setting the back gate voltage Vbg which is generated using a first voltage generator (DVG) circuit 192. Responsive to the control signal S, a second voltage generator circuit 194 operates to generate the control gate voltage Vcg. The first and second voltage generator circuits 192 and 194 are configured such that both the control gate voltage Vcg and the back gate voltage Vbg are dynamically variable. In particular, the configuration of the first and second voltage generator circuits 192 and 194 is such that, responsive to the control signal S, the generated control gate voltage Vcg output from the second voltage generator circuit is proportional in magnitude to the back gate voltage Vbg output from the first voltage generator circuit, but is inverse in polarity. As an example, for a control signal S that dynamically selects a back gate voltage Vbg in a range from 0V to 4V, the control gate voltage Vcg is dynamically set over a range from −0.1V to −0.6V. More generally speaking, the back gate voltage Vbg is chosen by control signal S to drive the ISFET 100 device into the conduction mode (i.e., above the threshold voltage). The control gate voltage Vcg is dynamically selected in response to the chosen back gate voltage to counterbalance the conduction mode, and because of this a voltage value of opposite polarity is generated.

The use of an opposite polarity voltage is mandatory for sensitivity enhancement (for example, if Vbg is swept from 0 to 4V, Vcg can be swept from 0 to −0.3V—or whatever negative voltage can be tolerated by the front gate of the transistor). The magnitude of the Vcg sweep has no single optimal value: the wider the sweep applied to the control gate, the greater the resulting sensitivity. But there are constraints set by the maximum permissible negative voltage that can be applied to the transistor front gate. In an example implementation, the Vbg sweep is 0 to 4V while the control gate sweep is −0.1 to −0.6V and this produces a 5× sensitivity amplification. If the transistor front gate can withstand −1.1V, then even greater sensitivity can be obtained by sweeping −0.1 to −1.1 V at the control gate. Regarding proportionality each Vcg sweeping point in voltage should correspond to a proportional sweeping point of Vbg. A proportional relationship is required if smooth ID-VBG curves are desired. Advantageously, information defining the functional proportional relationship (for example, magnitudes) between the control gate voltage Vcg and the back gate voltage Vbg can be programmed 196 into the bias voltage generator circuit 190. This information is used by the first and second voltage generator circuits 192 and 194 to generate the respective voltages. In this way, the same ISFET 100 configuration with bias voltage generator circuit 190 can be used in a number of different applications simply by adjusting the programmed functional relationship information for the control gate voltage Vcg and the back gate voltage Vbg depending on the desired application.

Figure 1:
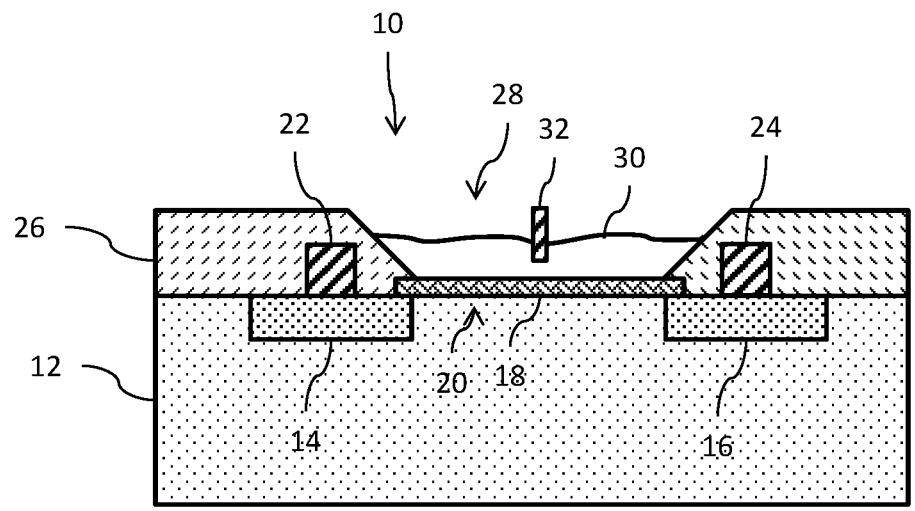
FIGS. 1 and 2 show prior art ion sensitive field effect transistor (ISFET) devices.
Figure 2:
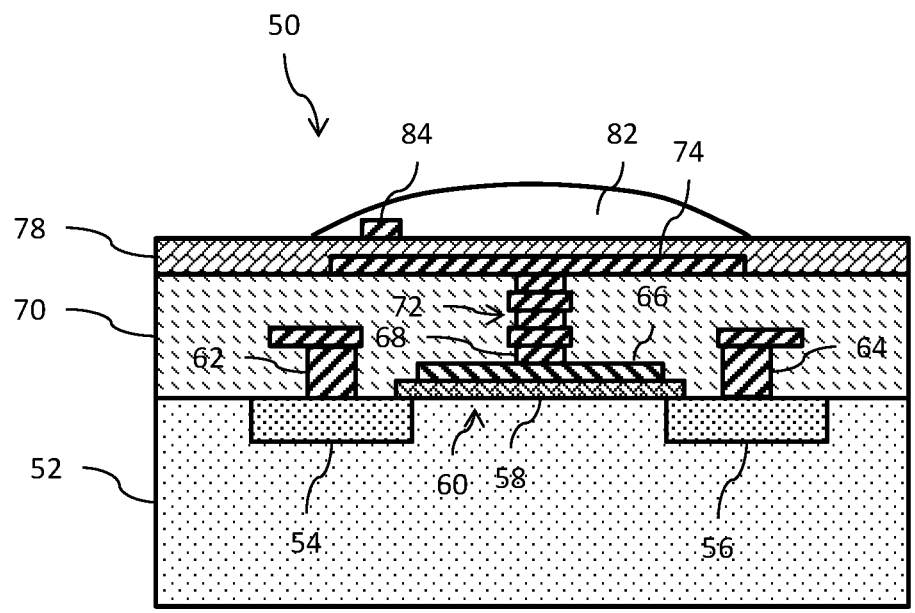

It is noted that limited sensitivity is a critical concern with prior art ISFET systems such those in FIGS. 1-2. This limited sensitivity has hampered commercialization. In many cases, there are only a few molars of the biomolecule available for sensing. Devices with reduced sensitivity may not be able to make a detection, or detection may require an extended sense time period. The ISFET 100 configuration with bias voltage generator circuit 190 has a much higher sensitivity level and thus can be used in many applications requiring surface functionalizations requiring high sensitivity. Applications with stringent measurement requirements for recording very small amounts of generated charge G include: protein sensing, probing DNA hybridization, gas sensing, biometric sensing.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for controlling operation of a dual gate ion sensitive field effect transistor (ISFET) having a first bias voltage node coupled to a back gate of the ISFET and a second bias voltage node coupled to a control gate of the ISFET, said method comprising:
   generating a dynamically sweeping back gate voltage for application to the first bias voltage node; and
   generating a dynamically sweeping control gate voltage for application to the second bias voltage node;
   wherein the dynamically sweeping back gate voltage and dynamically sweeping control gate voltage are simultaneously generated and a polarity of the dynamically sweeping back gate voltage is opposite a polarity of the dynamically sweeping control gate voltage.

2. The method of claim 1, wherein a magnitude of the dynamically sweeping control gate voltage is less than a magnitude of the dynamically sweeping back gate voltage.

3. The method of claim 1, wherein a magnitude of the dynamically sweeping control gate voltage is proportional to a magnitude of the dynamically sweeping back gate voltage.

4. The method of claim 1, wherein the ISFET includes an insulating layer and further comprising depositing a liquid for ion analysis on the insulating layer, applying control gate voltage to said liquid.

5. The method of claim 4, wherein the ion analysis is a pH analysis.

6. The method of claim 1, further comprising generating a drain current from the ISFET, wherein the applied dynamically sweeping control gate voltage causes a reduction in slope of a curve defining drain current as a function of change in the dynamically sweeping back gate voltage.

7. The method of claim 1, further comprising storing information which defines a relationship in magnitude of the dynamically sweeping back gate voltage and dynamically sweeping control gate voltage, wherein generating the dynamically sweeping back gate voltage and the dynamically sweeping control gate voltage comprises generating the dynamically sweeping back gate voltage and the dynamically sweeping control gate voltage in accordance with the stored information.

\* \* \* \* \*

UNITED STATES PATENT AND TRADEMARK OFFICE
CERTIFICATE OF CORRECTION

PATENT NO. : 10,684,251 B2
APPLICATION NO. : 15/631078
DATED : June 16, 2020
INVENTOR(S) : Getenet Tesega Ayele et al.

Page 1 of 1

It is certified that error appears in the above-identified patent and that said Letters Patent is hereby corrected as shown below:

In the Specification

At Column 4, Line 6, please replace the term [[ (G) ]] with -- (σ) --.

At Column 4, Line 14, please replace the term [[ (G) ]] with -- (σ) --.

At Column 6, Line 18, please replace the term [[ (G) ]] with -- (σ) --.

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*